United States Patent

Holtz

[15] 3,649,122
[45] Mar. 14, 1972

[54] METHOD AND APPARATUS FOR MEASURING THE POSITION COORDINATES OF ONE POINT IN RELATION TO A REFERENCE POINT

[72] Inventor: Eberhard Holtz, Aachen, Germany
[73] Assignee: Carl Zeiss-Stiftung, Wuerttemberg, Germany
[22] Filed: Mar. 27, 1970
[21] Appl. No.: 23,415

[30] Foreign Application Priority Data

Mar. 28, 1969 Germany..................P 19 15 935.4

[52] U.S. Cl..................................356/4, 250/209, 356/172
[51] Int. Cl. ........................................................G01g 11/26
[58] Field of Search....................356/153, 172, 156, 152, 28, 356/4; 33/46 AT, 60, 74, 125 A; 250/203, 209

[56] References Cited

UNITED STATES PATENTS

| | | | |
|---|---|---|---|
| 3,469,919 | 9/1969 | Zellner | 356/4 |
| 3,527,539 | 9/1970 | Studebaker | 356/156 |
| 3,486,826 | 12/1969 | Colvin et al. | 356/152 |
| 3,437,815 | 4/1969 | Bleicher | 250/203 |
| 3,085,159 | 4/1963 | McNancy | 356/156 |

Primary Examiner—Ronald L. Wibert
Assistant Examiner—J. Rothenberg
Attorney—Sandoe, Hopgood & Calimafde

[57] ABSTRACT

In a method and apparatus for measuring the vertical position of a point relative to a reference point spaced laterally therefrom, a laser beam is directed horizontally from the reference point to impinge upon a receiver at the other point. The receiver consists of a vertical line of separate, adjacent photoelectric units each of which is narrower than the laser beam in the vertical direction. The photoelectric units are connected in parallel with an identical ohmic resistor connected between similar poles of each adjacent pair of photoelectric units forming a chain of series connected resistors. A switch and a current measuring device are connected in circuit with the photoelectric units and resistor chain so that the total current emanating from the illuminated photoelectric units, and the partial current flowing between the illuminated photoelectric elements and one end of the resistance chain, are measured alternately. The ratio of the two current measurements gives the position of the point at which the axis of the laser beam impinges upon the line of photoelectric units relative to the length of the line of units. The laser beam may be modulated, and in each photoelectric unit the laser beam received thereby may be divided with each division focused at an aperture through which it passed to a photocell, for reducing the effect of interference.

11 Claims, 9 Drawing Figures

Patented March 14, 1972  3,649,122
3 Sheets-Sheet 1
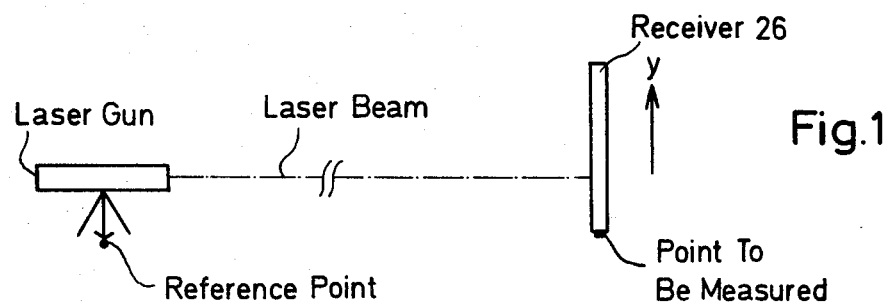
Fig.1
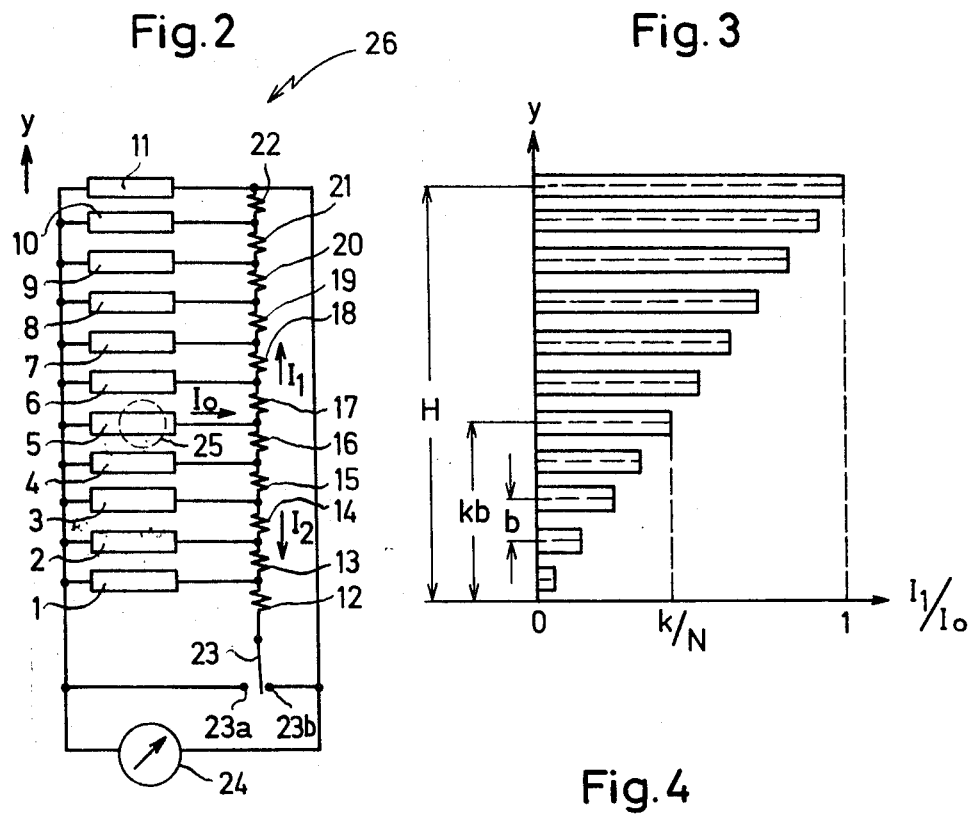
Fig.2
Fig.3
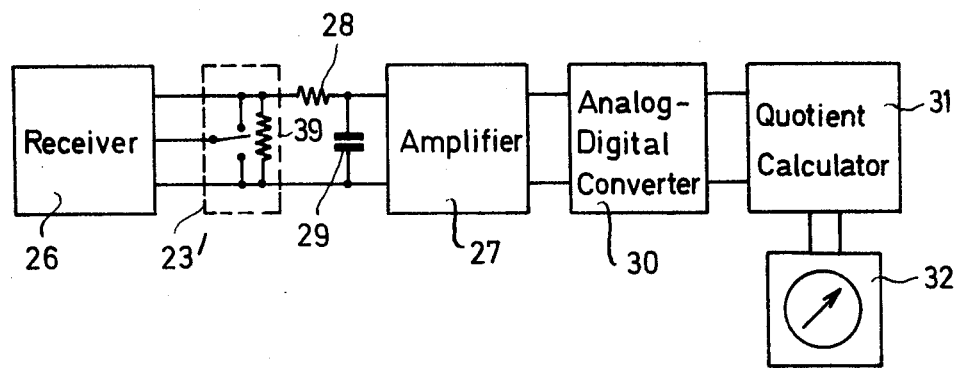
Fig.4

Patented March 14, 1972  3,649,122

METHOD AND APPARATUS FOR MEASURING THE POSITION COORDINATES OF ONE POINT IN RELATION TO A REFERENCE POINT

The present invention is a method and apparatus for measuring the height differences between two selected points on a terrain. More particularly it is such a method and apparatus, which utilizes a laser beam and photoelectric means for making the height measurement.

The conventional method of making such measurements is to place a transit at one point and a graduated measuring stick at the other, and, by looking through the telescope of the transit which is in horizontal position, observe the measuring stick. The value of the measuring stick graduation which is aligned with the crosshairs of the transit telescope gives the relative height when the height of the transit above the terrain is taken into consideration. This known method, however, cannot be automated, and cannot be used under poor lighting conditions, as at night.

An object of the present invention is to provide a method and apparatus for machining such measurements with greater and more consistent accuracy than the aforementioned known method.

Another object is to provide such a measuring method and apparatus, of which at least the elements most susceptible to human error may be automated.

A further object is to provide such a method and apparatus which is unaffected by light conditions and which can be used at night.

Still another object is to provide such a method and apparatus that is adapted to measure the height of one point relative to another, which points may be much further apart than with known visual methods and apparatus.

In accordance with the invention, the height of one point is transmitted to another point by means of a horizontal laser beam; the vertical distance of the axis of the laser beam is measured electrically and indicated without the need of an observer. The laser beam emanating from one point is directed at a receiver which is at another point and which consists of identical photoelectric partial receiver units arranged in abutting side-by-side relation in a line in the direction of the coordinates to be measured. The receiver units are connected in parallel with their similar poles connected respectively to the nodal points of a series connected chain of identical ohmic resistors. The total current emanating from the illuminated partial receiver and the partial current flowing between this partial receiver and one end of the resistance chain are measured alternately, to provide a ratio of these two measurements.

This makes possible the automation of the measurement and the continuous registration of the results measured. Since a laser beam is used for the transmission of the reference coordinates, it is possible to take measurements regardless of the given lighting conditions, even at night. In addition, as compared to visual observation, it is possible to make measurements at a much greater distance between the points.

In principle, taking a measurement by means of a horizontal laser beam would be possible with a device in which the beam is directed at a vertical arrangement of photoelectric units for measuring the height of the beam where it impinges upon one of the units. Such an arrangement has the disadvantage however, that the accuracy of measurement depends upon the width of the unit, which cannot be adjusted, practically, as by modifying the beam diameter. Moreover, in measuring the conditions at the several units the conditions must be ascertained successively and then averaged, which necessitates much electronic equipment, particularly when using a time-variable, fluctuating laser beam.

The apparatus designed in accordance with this invention avoids these disadvantages and is characterized by a relatively simple and inexpensive construction. A laser beam gun directs a laser beam in a horizontal path to a receiver consisting of a multiplicity of identical photoelectric partial receiver units whose size in the direction of the coordinate to be measured is smaller than the diameter of the laser beam and which are close to each other in that direction. All the partial receiver units are wired in parallel and a resistor interposed between the identical poles of successive partial receivers. A switch is provided at one end of the chain of resistors for feeding to a current measuring instrument, alternatively the total current emanating from the illuminated partial receiver units and the portion of current flowing between the partial receiver units and the part of the resistor chain located at the other end of the receiver. This apparatus is of simple design and furnishes inertia-free measuring results in the form of an electrical signal within predetermined error tolerances, regardless of the beam diameter, or of the laser output.

In order to achieve the greatest possible measuring accuracy it is desirable to have the partial receivers close together, without any gaps between. This is suitably achieved by having adjacent light conductors connected to the respective partial receiver units and arranged in the direction of the coordinates to be measured and disposed in the path of the laser beam. Thus, the partial receivers themselves may be randomly arranged while the light conductors are mounted close together in a line.

It is advantageous to dispose the new equipment in a light-tight housing containing a cylinder lens for focusing the laser beam through an aperture, which is at the focus, and onto a photoelectric partial receiver unit disposed behind the aperture. This arrangement assures that practically the entire beam output falls on the photoelectric partial receiver units, and diminishes the effect of a beam being received at an angle, without the information of the beam height getting lost, so that the ratio of information output to interfering signals is improved materially.

To reduce the influence of interfering light is further expedient to modulate the laser beam as compared to measuring with an unmodulated beam.

In one form the position coordinates are measured simultaneously by two receiver units in one horizontal plane, a semipermeable reflector being disposed in the path of the laser beam to split the beam and feed the separate beam parts respectively to the two receiver units.

In using the apparatus of this invention for measuring the differential coordinates between two points relatively far apart in space, the beam may be subjected to atmospherically caused position, shape and output fluctuations which would appear at the receiver. In this case it is advantageous to feed the test voltages to a measurement amplifier via a filter, such as an RC network, to provide temporal integration and thus produce a mean value.

It is expedient in many cases to extend the measuring range of the apparatus below the zero point and this is done by the addition of partial receiver units of opposite polarity. This makes it possible to determine very accurately the passage of the laser beam through the zero point and to compensate for photo currents caused by light interference.

The invention is explained in greater detail with reference to the examples illustrated in the accompanying drawings in which:

FIG. 1 is a schematic illustration of the arrangement and manner of using the apparatus of this invention;

FIG. 2 is a circuit diagram of one form of receiver in accordance with the invention;

FIG. 3 is a graph of the quotient of the two currents measured successively by the equipment according to FIG. 2 as a function of the $y$ coordinate for the case of an infinitely thin laser beam;

FIG. 4 is a schematic illustration of measuring circuitry coupled to the receiver;

Figure 5:
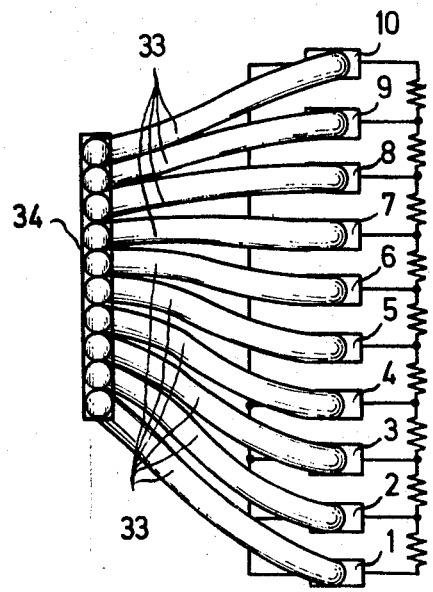
FIG. 5 is a front view of a receiver in which the laser beam is conducted to the partial receiver via light conductors.

In the drawings FIG. 1 illustrates the general arrangement of apparatus in accordance with this invention and the method of the invention wherein the measurement of the vertical position of a point to be measured relative to a reference point is made by directing a laser beam from a laser gun, which is at the reference point, horizontally to a receiver which is at the point to be measured. The receiver which is designated 26, extends in a vertical direction above the point to be measured so that the laser beam impinges upon it at a point along its length, which defines a Y axis.

As illustrated in FIG. 2 the receiver 26 is formed by a number of partial receiver units 1 to 11 arranged adjacent each other in the direction of the Y coordinate to be measured. All the receiver units 1 to 11 are identical photoelectric elements and of as nearly the same sensitivity as possible, and they preferably match the laser frequency spectrally to achieve as good an information to interference signal ratio as possible. It should be pointed out, however, that in case of a mismatch no measuring error occurs.

The partial receiver units 1 to 11 are wired in parallel and resistors 12 to 22 are interposed between the identical poles of successive partial receiver units, respectively. A switch 23 at the lower end of the chain of resistors is connected to feed current emanating from receiver units, which are illuminated by the laser beam, to a measuring instrument 24 in a manner described in detail below.

For measuring, the laser beam impinges upon a partial receiver unit, such as the unit 5 as illustrated in FIG. 2, and produces a light spot 35, shown simplified in the form of a circle. The photoelements comprising the partial receiving units 1 to 11 have a negligibly small internal conductance and furnish a photo current proportional to the impinging laser output. The photo current emanating from the impinged partial receiver unit 5 is designated $I_o$. This current is divided in the chain of resistors 12 to 22 into the two partial currents $I_1$ and $I_2$. The symbol k represents the impinged partial receiver unit generally and N represents the total number of all partial receivers, so that: $I_1$ is $I_o \cdot k/N$, while $I_2$ is $I_o \cdot (N-k)/N$.

When a measurement is to be taken, the switch 23 is moved back and forth between contacts 23a and 23b. When switch 23 rests on contact 23a, the measuring instrument 24, having no internal conductance, measures the current $I_1$. When switch 23 rests on contact 23b, the measuring instrument 24 measures the total current $I_o$.

Now, when the ratio $I_1/I_o$ is formed from these two measurements, it will be $k/N$. Referring, also to the graph of FIG. 3, if the distance from center to center of adjacent partial receiver units is called b, and b is included in the quotient $I_1/I_o$, the result is $kxb/Nxb$. As seen in FIG. 3, $Nxb$ is the length of the receiver as measured in the direction of the y coordinate. This length is designated H and is a constant.

It follows from this that the y coordinate is proportional to the ratio $I_1/I_o$. Thus, as one can readily see the measured value is independent of the output of the receiver laser beam, and is also independent of a uniform modification of all resistors 12 to 22. Since these resistors are equal and of the same design it may be assumed that their values also change uniformly, with changing temperatures, for example.

FIG. 3 shows the curve of the quotient $I_1/I_o$ as a function of the y coordinate in the case of an infinitely thin laser beam. If the beam diameter is greater than one element width b, the photo currents superpose mutually because of their linearity and the curve of the quotient $I_1/I_o$, which is a function of the y coordinate, approaches a straight line as beam diameter increases. Thorough tests and calculations proved that the test results were more accurate as the beam diameter was increased. Above a certain beam diameter, the test result is then independent of the beam diameter within predetermined error tolerances.

To avoid a measuring error which may be caused by a slightly different sensitivity of adjacent elements it is expedient to sort the photoelectric partial receiver units 1 to 11 according to their sensitivity and to assemble them in the receiver in the order of rising sensitivity.

Fig. 4 shows measuring circuitry coupled to the receiver 26, which in this instance includes an electronic switch 23' in place of the switch 23 shown in FIG. 2. Also the measuring instrument 24 of FIG. 1 is here replaced by a resistor 39 for measuring purposes. Switch 23' alternately feeds the current $I_1$ and $I_o$ to a measurement amplifier 27. This amplifier may change its amplification without inducing an error in the measurement, provided the change takes place slowly enough.

If the distance between the transmitter and the receiver 26 is relatively great, the beam position at the receiver 26 will fluctuate somewhat due to the turbulence of the air. A modification of the beam profile over the transmission distance to the receiver causes no error in measurement, because the receiver integrates over the spatial beam profile. In order to exclude or reduce measurement errors caused by fluctuations in the beam position it is expedient to connect into the circuit, before the amplifier 29 an RC network, 28, 29 consisting of a resistor 28 and a capacitor 29, which produces a mean value of the beam position by temporal integration.

Following the measurement amplifier 27 is an analog digital converter 30 coupled to a quotient calculator 31, which forms the ratio $I_1/I_o$ and feeds it to an indicating and registering instrument 32. The latter serves the continuous registration of the automatically determined results of the measurements.

FIG. 5 shows a form receiver in which the laser light is conducted to the various partial receiver units 1 to 10 by light conductors 33. As shown, the outer ends of the light conductors 33 are in a row 34 and touch each other. In this way the measuring accuracy is increased because there are no gaps or blind spots along the line on which the photoelectric partial receiver laser beam impinges. It is also expedient, in order to pick up the laser beam as uniformly as possible, to use light conductors having a square or rectangular face cross section.

Other arrangements for conducting light to the respective partial receiver units are also possible, for example several light conductors may be provided for each receiver unit.

Figure 6:
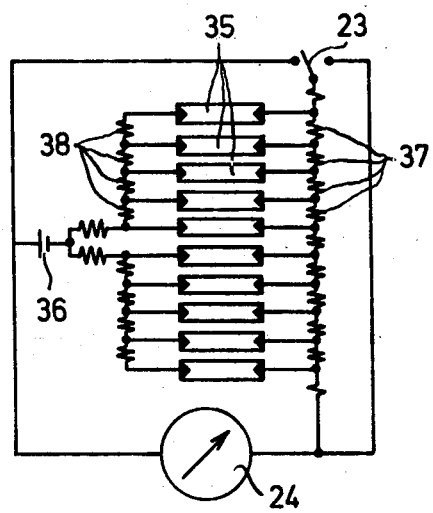
FIG. 6 is a circuit diagram of a receiver constructed with photoresistors.

Photoelements or photodiodes that have configurations to provide light-controlled power sources with negligible internal conductance may be used as photoelectric partial receivers in the receiver shown in FIGS. 2 and 5. exists. It is also possible to construct a receiver with photo-resistors. An example is shown in FIG. 6 in which, photo-resistors 35 are used as photoelectric partial receiver units. In this case electric power is provided by a source 36 of voltage on which no excessive demands are made regarding its constancy. The resistance chain consisting of resistors 37 is so dimensioned that the greatest resistance measured in the center of the chain is smaller than the greatest terminal resistance permissible for the photoelectric partial receivers used, at which linearity between the output received and the photo current still exits.

If all partial receivers in the described receivers are to operate at the same terminal resistance, a compensating resistor should be put in series with each partial receiver unit. Such compensation is suitably provided by a second chain of identical resistors 38, as shown in FIG. 6.

Figure 7:
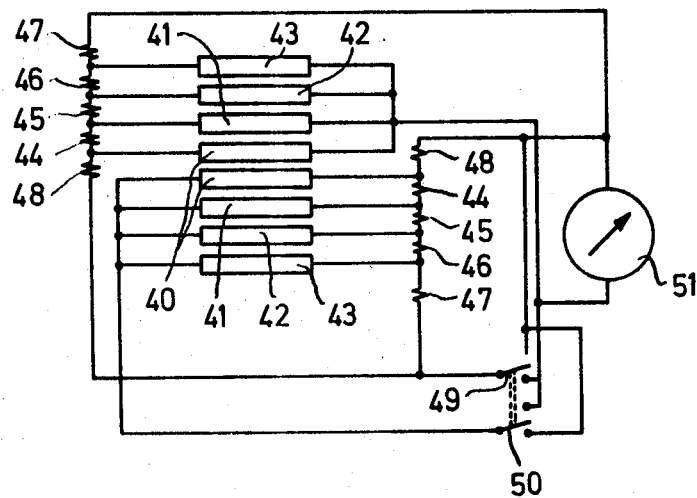
FIG. 7 is a circuit diagram of a receiver whose receiving range is also extended below the zero point.

The receivers shown in FIG. 2, 5 and 6 are adapted to measure the beam coordinate y between zero and a height H. FIG. 7 shows a receiver in which the receiving range is extended below the zero point to −H. For this purpose the receiver incorporates two identical receiver arrangements, each consisting of a photoelectric partial receivers 40 to 43 and of the resistance chain formed by resistors 44 to 48. The resistors 44, 45 and 46 are identical and the resistors 47 and 48 have only half the ohmic resistance of resistors 44 to 46. Switches 49 and 50, which are constructed to be actuated simultaneously, feed the total current $I_o$ and the quotient $I_1/I_o$ alternately, to the measuring instrument 51 with the two receiver arrangements wired as shown in FIG. 7, there results a constant linear function between the beam position y and the photo current $I_1$.

When motion of the laser beam is uniform, this current moves through the zero point according to a linear function, the ascent depending only on the output, and on the shape of the laser beam. This circuit simultaneously compensates for light interference, provided it is uniformily distributed over the receiver area. This configuration shown in FIG. 7 operates by accurately determining the position of the axis of the laser beam with respect to the zero point of the measuring equipment. The zero point thus serves as a reference point for the measurement of the coordinate of the laser beam received.

Figure 8:
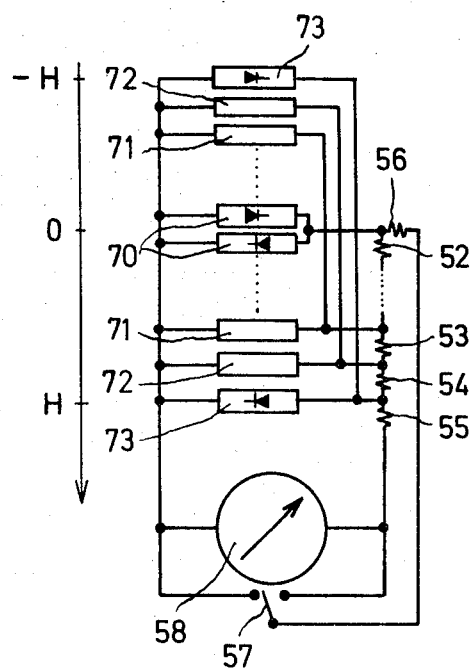
FIG. 8 is a circuit diagram of another form of receiver whose receiving range is also extended below the zero point.

FIG. 8 shows another embodiment in which two identical receivers, each consisting of partial receiver units 70 to 73, for measuring the beam coordinate y in a range between H and −H. In this embodiment only one resistance chain consisting of resistors 52 to 55 and 56 is used, with resistor 56 having only half the ohmic resistance of each of the resistors 52 to 55, which are identical. Each of the partial receiver units 70 to 73 located below the zero point is connected in parallel, in reversed polarity to the corresponding partial receiver units 70 to 73 that are arranged in the positive y direction. Aside from utilizing only half the number of resistors of the FIG. 7 embodiment the circuit shown in FIG. 8 has the additional advantage that photo currents caused by uniform interference radiation are compensated for directly by the partial receivers and do not flow across the resistance chain. This is of importance since the countervoltage caused by the voltage drop in the resistors of the chain must not exceed a predetermined value in order to keep the linearity between output received and photo current intact.

Figure 9:
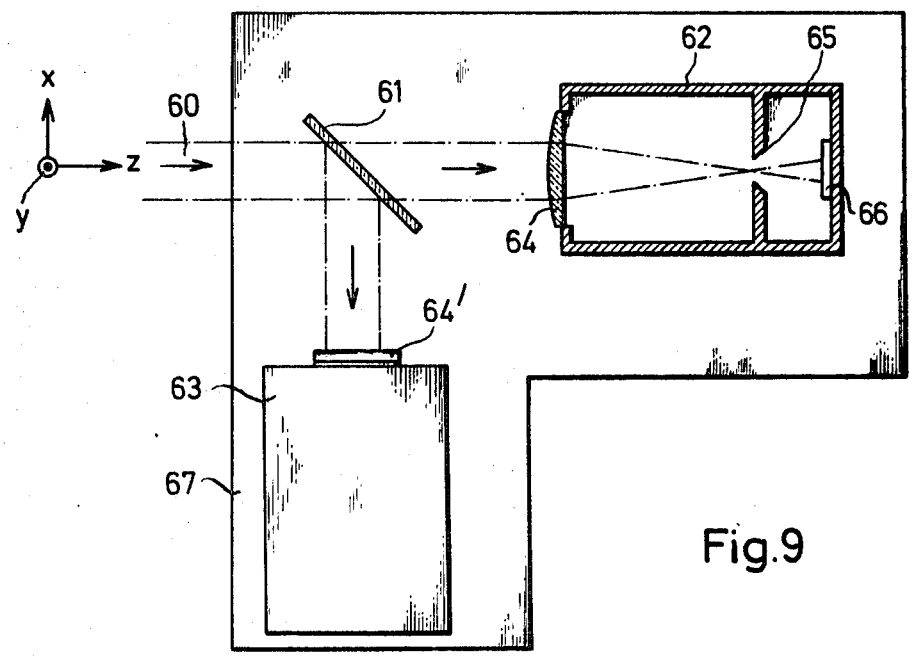
FIG. 9 is a top plan view, partly in section, of a form of partial receiving unit which, incorporates two receiver elements in the horizontal plane.

FIG. 9 shows an arrangement in which two receivers are mounted for measuring the position coordinates in one plane. A horizontal laser beam 60 coming from the reference point impinges upon a semipermeable reflector 61 which divides the beam and feeds the two portions to two separate but identical photocells in the light-tight housings 62 and 63. The reflector 61 and the housing 62, 63 are rigidly mounted on a common horizontal base plate 67. The components in each of the housings 62, 63 are identical, but only the components inside housing 62 are shown in the drawing, it being understood that similar components are inside housing 63. Each housing contains a cylinder lens, 64 and 64′ which focuses in the plane of an aperture, 65 and 65′ behind which a photoelectric receiver is disposed. The receiver consisting of a partial receiver units 66 and disposed in housing 62 measures the beam coordinate y, whereas the receiver disposed in housing 63 measures the beam coordinate x.

Each cylinder lens 64, 64′ focuses to laser beam 60 of circular cross section in the direction of the larger dimension of the respective partial receiver units so as to develop a beam of elliptical cross section whose waist is located in the plane of the aperture 65. The width of each aperture 65 is so chosen that the receiving angle is as small as possible, measuring approximately 0.5°, for example. The laser beam expands again behind the aperture 65 and the receiver in each of the housings 62 and 63 is arranged so that the laser beam's lateral expanse is almost that of the partial receiver units 66. Thus, in conjunction with the effect of the width of the aperture 65, the receiving angle is diminished without the information of the beam height getting lost. This improves substantially the information in interference signal output ratio. The laser beam may also be modulated to reduce the influence of light interference. This is suitably accomplished by amplitude modulation of the laser light by excitation modulation. This modulation may be used in combination with the arrangement shown in FIG. 9, but need not be.

The cylinder lenses 64 and 64′ and the photoelectric partial receiver units in the housings 62 and 63, in combination with the resistance chains, perform a spatial integration over the intensity distribution of the laser beam received. The RC network 28, 29 shown in FIG. 4 performs a temporal integration. The spatial and temporal integration, which are thus provided for in a simple manner, permit the measurement and registration of the mean beam position, even when laser beams are greatly distorted and fluctuating.

What is claimed is:

1. A method of measuring the vertical position of one point relative to a reference point spaced laterally therefrom comprising placing a line of vertically adjacent light receiving surfaces of a number of substantially identical photoelectric receiver units at said one point, directing a horizontal laser beam from the reference point to impinge upon the line of receiving surfaces, the vertical diameter of the laser beam being greater than the vertical dimension of each of said receiving surfaces, coupling the same poles of the photoelectric units to the nodal points of a series connected chain of identical ohmic resistors, respectively, measuring the total current from the photoelectric units that are illuminated by the laser beam, measuring the current flowing between said illuminated photoelectric units and one end of the chain of resistors, and comparing said current measurements to provide a ratio corresponding to the position of the point at which the axis of the laser beam impinges upon the line of said receiving surfaces relative to the total length of said line of receiving surfaces.

2. The method of claim 1 including modulating the laser beam.

3. Apparatus for measuring the vertical position of one point relative to a reference point spaced laterally therefrom, comprising, means for generating a horizontal laser beam, a receiver placed in the path of the laser beam for the laser beam to impinge upon it, said receiver consisting of a number of substantially identical photoelectric receiver units each having a light receiving surface, said receiving surfaces being arranged in abutting side by side relation to be in a line generally normal to the axis of the laser beam, the vertical dimension of each receiving surface being less than the vertical diameter of the laser beam, said receiver units being electrically connected in parallel, substantially identical ohmic resistors being connected between similar poles of adjacent pairs of the receiver units, respectively, to form a chain of series connected resistors, current measuring means, movable switch means to connect the photoelectric receiver units and the resistor chain selectively in circuit with the measuring means to measure selectively, the total current from the photoelectric receiver units that are illuminated by the laser beam, and the current flowing between said illuminated units and one end of the chain of resistors for forming a ratio of said current measurements corresponding to the position of the point at which the axis of the laser beam impinges upon the line of said receiving surfaces relative to the total length of said line of receiving surfaces.

4. The apparatus of claim 3 in which said receiver comprises lens means receiving at least a beam portion of a laser beam impinging upon the receiver, a wall spaced from the lens means and having an aperture therethrough, and a number of photoelectric receiver units arranged on the opposite side of the wall from the lens means, said lens means, said wall and said photoelectric receiver units being arranged for a beam portion received by the lens to be focused in the plane of said aperture and be projected therethrough onto the photoelectric units.

5. The apparatus of claim 4 in which said photoelectric receiver units are placed for their lateral dimensions to substantially coincide with the lateral expanse of said beam portion as projected thereon.

6. The apparatus of claim 3 in which a semipermeable reflector is provided for receiving a laser beam impinging upon it and dividing said beam portion in two beam parts, a first receiver arranged so to receive one of said beam parts and a second receiver arranged to receive the other of said beam parts, to measure the position coordinates of said beam in the two coordinates of one plane.

7. The apparatus of claim 6 in which said first and said second receiver each have in combination therewith lens means receiving the beam part directed thereto, a wall spaced from the lens means and having an aperture therethrough, the respective photoelectric receiver units being on the opposite side of the wall from the lens means, said wall and said receiver units being arranged for the beam part received by the lens to be focused in the plane of said aperture and projected therethrough onto said photoelectric receiver units.

8. The apparatus of claim 3 in which said current measuring means comprises a resistor connected in paralled with said switch means, a measurement amplifier coupled to receive current from the switch means in either selected position of the switch means, an analog-digital converter coupled to the measurement amplifier, a quotient calculator coupled to the analog-digital converter forming said ratio from said current measurements, and means coupled to the quotient calculator indicating said ratio.

9. The apparatus of claim 9 including an RC network connected between said resistor and said measurement amplifier passing a mean value of current therebetween.

10. The apparatus of claim 3 including a second number of substantially identical photoelectric receiver units identical with the first mentioned number of said units with their light-receiving surfaces in a similar line with the latter line being a continuation of said first mentioned line, said second number of said units being electrically connected in parallel, a second chain of series connected substantially identical ohmic resistors the ohmic values of the latter being substantially identical to the ohmic values of the resistors of the first mentioned chain, the resistors of the second chain being connected between similar poles of adjacent pairs of the receiver units, respectively, of said second number, said second number of receiver units being connected to the resistors of said second chain and to said switch means in opposite relation to the connections of the first number of receiver units to the resistors of the first mentioned chain and to said switch means, whereby the first number of said units measures the vertical position of an impinging laser beam in one vertical direction from the junction of said two lines of receiver units and the second number of said units measures said vertical position in the opposite vertical direction from the junction.

11. The apparatus of claim 3 including additional photoelectric receiver units which are identical with the first mentioned photoelectric units and whose adjacent light receiving surfaces extend in a line as a continuation of said line of said units and between similar poles of which resistors of said chain are connected, but with the electrical connections of said additional receiver units to the resistors and to the switch means being the reverse of the connections of the first mentioned photoelectric receiver units thereto, and including a second-value resistor having one half the ohmic resistance of each of the resistors in the chain, said second-value resistor being coupled at one side to the switch means and having its other side coupled to each of the two adjacent receiver units which are in reversed position with respect to each other where the continuation line of units meet the remainder of the line of units, said other side of the second value resistor being connected to the poles of the latter two receiver units which are connected directly to the resistor chain, whereby the first mentioned line of said units measures the vertical position of an impinging laser beam in one vertical direction from the said meeting of first mentioned line and the continuation line of said units, and the second number of said units measures said vertical position in the opposite vertical direction from the junction.

* * * * *